United States Patent [19]

Suska

[11] Patent Number: 4,612,485
[45] Date of Patent: Sep. 16, 1986

[54] OVERHEAD DOORS OPERATING APPARATUS

[76] Inventor: Charles R. Suska, R.R. 1, Box 14, Roxbury, Conn. 06783

[21] Appl. No.: 708,276

[22] Filed: Mar. 5, 1985

[51] Int. Cl.⁴ .............................................. H02K 7/14
[52] U.S. Cl. ........................................ 318/5; 318/15; 318/16
[58] Field of Search ....................... 49/17, 18, 24, 118, 49/139, 280, 334, 340, 349, 80, 82, 84, 86, 136, 163, 168, 197, 198, 199, 203, 205; 318/5, 15, 16; 310/103

[56] References Cited

U.S. PATENT DOCUMENTS

| | | | |
|---|---|---|---|
| 2,961,076 | 11/1960 | White et al. | 49/18 |
| 3,075,400 | 1/1963 | Carlson | 74/844 |
| 3,353,299 | 11/1967 | Castonguay | 49/104 |
| 3,576,482 | 4/1971 | Rhee | 318/16 |
| 3,792,332 | 2/1974 | Fuller | 318/102 X |
| 4,001,969 | 1/1977 | Hoobery | 49/95 |

FOREIGN PATENT DOCUMENTS 0798694 1/1981 U.S.S.R. ................................ 318/14

OTHER PUBLICATIONS

"Garage Door Openers", *Consumer Reports*, Nov. 1978, pp. 646–651.

*Primary Examiner*—William M. Shoop, Jr.
*Assistant Examiner*—Bentsu Ro
*Attorney, Agent, or Firm*—Brumbaugh, Graves, Donohue & Raymond

[57] ABSTRACT

Overhead doors operating apparatus uses a single motor power unit to operate a selected one of a plurality of overhead doors through a selectively energized coupling, such as an electromagnetic clutch, or if desired, all of the doors in unison by energizing all the couplings. Thus only one motor power unit, instead of a power unit for each door, is needed to operate selectively one or more of the doors.

12 Claims, 4 Drawing Figures

OVERHEAD DOORS OPERATING APPARATUS

BACKGROUND OF THE INVENTION

Modern garages have a capacity for two, three or more cars. In a two-car garage, a single door is often used. Commonly such doors are of the overhead type opened and closed by an electrically powered door operator. However, single doors used for two or more garage bays are wide, unstable, tend to drag on one side and can cock and jam. Also, the weight of such large doors requires additional motor power to drive them open and closed. It has been found preferable, therefore, to use a separate door for each garage bay to insure reliable operation and afford privacy, security and less power usage. Smaller and lighter overhead doors also minimize mechanical problems with the door mounting mechanisms.

Non-residential garages and the like often include a number of bays that desirably can be opened individually or in unison. For example, during warm weather, receiving and shipping bays are normally opened all day, thus being opened and closed together at the beginning and end of the work period. On the other hand, during cold weather, the bays are opened individually. In another example, a firehouse normally opens one door to dispatch a single piece of equipment, but for major fires all doors must be opened together.

A plurality of overhead doors for multiple bay garages and the like, while providing many advantages, are relatively expensive when electrically operated by conventional means. Each door must be driven by a separate power unit which normally includes a motor, speed reducer and controls. With a three bay garage, for example, three separate motor power units drive the three doors. The power units are activated by manual switches and, quite commonly, radio control units responding to signals generated by small radio transmitters. The redundant separate motor power units for each of the three doors involves a substantial expense for this type of installation.

BRIEF SUMMARY OF THE INVENTION

The present invention provides an improved apparatus for operating selectively one of a plurality of overhead doors. In another embodiment, the doors may be operated alone, or in unison. In particular, the inventive system uses a single motor power unit to drive each door of a plurality of doors, or in the other embodiment, all doors, in a garage or other enclosure. The use of a single power unit eliminates the expense of the additional one, two or more power units normally required to drive the overhead doors.

To operate a plurality of overhead doors selectively in accordance with the present invention, a single motor power unit is coupled to a drive mechanism associated with a plurality of doors through selective couplings. Any desired form of selective coupling can be used, including a type of electromagnetic clutch, a solenoid operated dog clutch or the like. With the power unit joined to the selective coupling by a drive mechanism, such as a chain or shaft, energization of the power unit and actuation of a selected one of the couplings will result in operation, i.e., opening or closing, of a one of the overhead doors. If desired, additional provisions can be made to energize the power unit and activate all of the couplings to open or close all of the doors in unison.

These and other features and advantages of the invention will be more readily understood when the following description is read in connection with the accompanying drawings.

DESCRIPTION OF EXEMPLARY EMBODIMENTS

Figure 1:
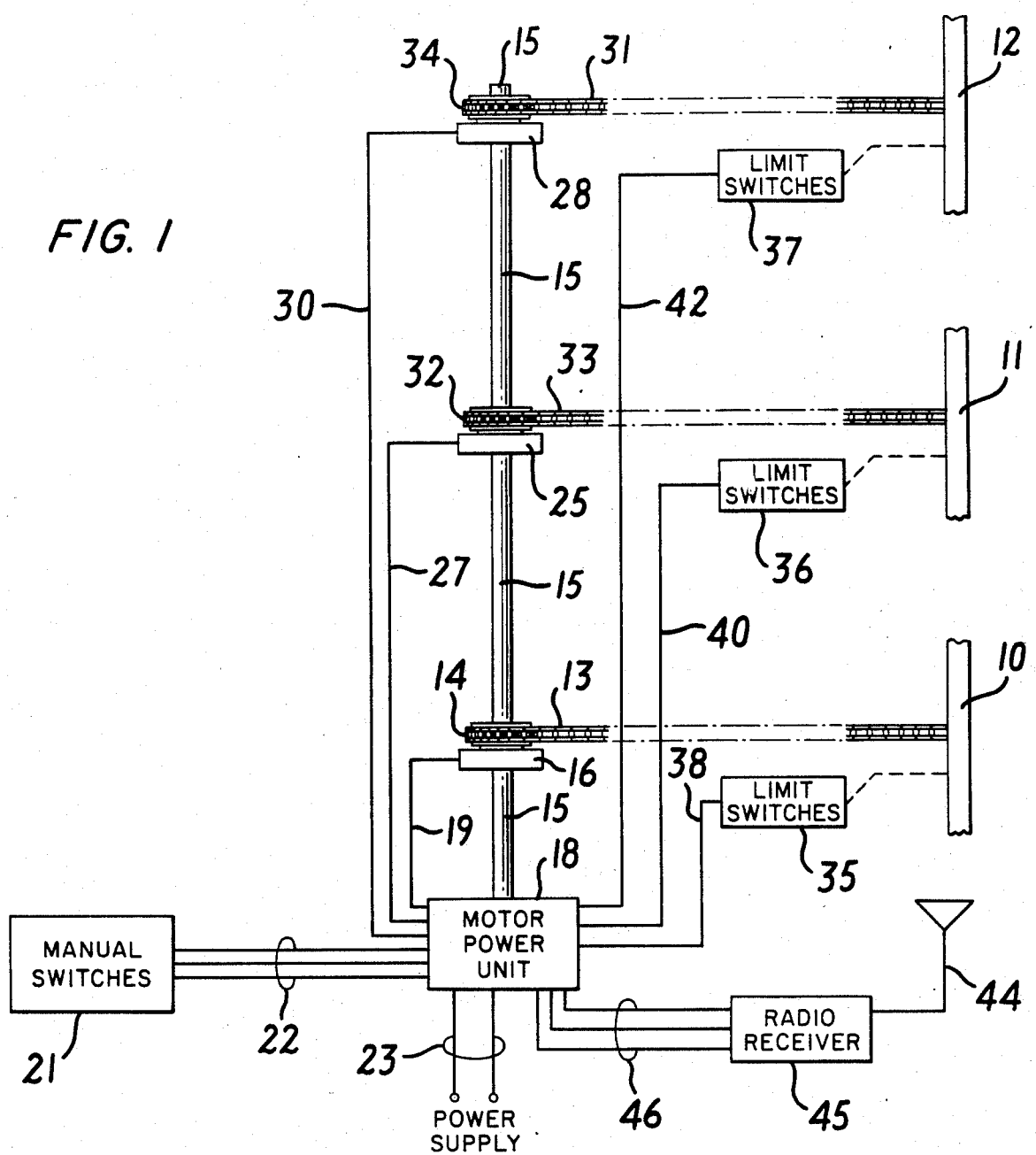
FIG. 1 is a diagrammatic view in block form of a selective multiple door opening system in accordance with the present invention.

Referring to the drawings in greater detail with particular reference to FIG. 1, three overhead doors 10, 11 and 12 are mounted in a conventional manner to close three bays of a three-car garage. The mounting may include tracks for sectional doors or may comprise jamb mounted mechanisms for trackless mounting of one-piece doors, as is well known in the art. Each door is opened and closed by a chain drive track arrangement. These and similar chain drives are used in the overhead door operator art.

The door 10 is driven by a chain loop 13 along a track extending to door 10 and passing over a sprocket 14, having a horizontal axis, mounted concentrically with a shaft 15. The shaft 15 extends through a selective coupling 16 to a motor power unit 18.

The coupling 16 functions to connect the shaft 15 to the sprocket 14 when it is energized through cable 19. Thus the shaft 15 is connected to an input member of the coupling 16 and the sprocket 14 to an output member, the input and output members being coupled together when the coupling is energized. The selective coupling may be an electromagnetic clutch, a solenoid operated dog clutch or the like. For example, Electroid Corporation manufactures and sells an EC Series of electromagnetic clutches, and Stearns Division of P.T. Companies, Inc. manufactures and sells an MSR Clutch-Coupling. However, it will be understood that there are disclosed in U.S. patents numerous other couplings available to transmit rotary motion selectively upon being energized or, in some instances, upon being de-energized.

The motor power unit 18, coupled by cable 23 to a power supply, is similar to drive units for known overhead door operators. It includes a motor ordinarily having on the order of ⅓ horsepower, a speed reducer, an output shaft and control circuits. The motor power unit may be energized by manual switches 21 connected by cable 22 to the unit 18. The three manual switches included in the unit 21, in addition to energizing the motor power unit 18, selectively cause energization of the coupling 16 through circuits in the motor power unit 18 and the line 19, another coupling 25 through line 27, and still a further coupling 28 through line 30. The couplings may be energized slightly earlier or later, or simultaneously with energization of the power unit, depending on the type of coupling used. Thus, with a dog-type coupling, earlier energization is preferable. With a friction-type clutch, later energization may be preferred.

If the feature of opening or closing all of the doors in unison is desirable, for example in receiving or shipping bays, or firehouses, an additional ganged switch can be used in the manual switches 21 in parallel with the three manual switches. Thus when the ganged switch is closed, it energizes the motor power unit 18 and the three couplings 16, 25 and 28, thereby resulting in the operation of the three doors 10, 11 and 12 together. It will be understood that with this arrangement, the motor power unit 18 will be more powerful and the common mechanical drive means of sufficient strength to transmit the increased power to the three or more couplings.

The shaft 15 extends through the coupling 25, its output shaft carrying a sprocket 32 driving chain loop 33 on a track coupled to the door 11. The shaft 15 continues through the coupling 28 and the sprocket 34 carrying a chain loop 31 connected to the door 12. Energization of the coupling 28 connects the shaft 15 to the sprocket 34 mounted on the output member of the coupling.

Limit switches 35, 36 and 37, conventionally used in overhead door operators, are connected by lines 38, 40 and 42 to the motor power unit 18. When the door 10 is driven towards its open position, the power unit 18 continues to operate until the door mechanism engages one of the limit switches 35 which causes through the line 38 operation of suitable circuits in the motor power unit 18 to de-energize the motor power unit 18 and the coupling 16 through line 19. This can be accomplished by interrupting power to the motor power unit 18 and the clutch 16 or by supplying signals to actuate suitable electrical relays in the unit and clutch. In like manner, when the door 10 is driven closed by reverse operation of the motor power unit 18, another limit switch in the switches 35 is actuated at the end of the door closing travel to again cause through the line 38 de-energization of the motor power unit 18 and the coupling 16.

Ordinarily overhead door operating systems are designed to be energized by radio signals. Thus, an antenna 44 connected to a radio receiver 45 provides for remote door opening and closing in the system of FIG. 1. More particularly, the radio receiver 45 is provided with three separately tuned RF circuits and three separate output circuits to respond selectively to three different radio frequencies, one for each of the doors 10, 11 and 12. Upon receipt of a signal coded to the door 10, an output cable 46 leading to the motor power unit 18 is energized to initiate operation of the motor power unit to open the door 10. At the same time, or slightly earlier or later, circuits in the motor power unit 18 energize the input line 19 of the coupling 16, causing it to connect the shaft 15 to the sprocket 14, thereby rotating the sprocket 14 to drive the door 10 open through the chain loop 13.

When the door 10 reaches the limit of its travel after being opened, it operates one of the limit switches 35 connected through the line 38 to the motor power unit 18. In the same manner discussed above in connection with the limit switch 35 and the motor power unit 18, the motor power unit 18 and coupling 16 are de-energized.

Upon receiving another signal from the coded radio transmitter for the door 10, or after a predetermined time interval, the motor power unit 18 is caused to operate in a reverse direction and, simultaneously, or slightly earlier or later, the clutch 16 is again energized to cause rotation of the sprocket 14 and chain loop 13 to close the door 10. At the end of its travel, the door 10 mechanism operates another switch in the limit switches 35 which results in de-energization of the motor power unit 18 and the coupling 16.

The opening and closing of doors 11 and 12 is similarly achieved through coded radio signals received by the antenna 44 and the radio receiver 45. For example, to open the door 12, a coded radio frequency is transmitted to the radio receiver 45 which energizes the motor power unit 18 to rotate the shaft 15. At the same time, or slightly earlier or later, the coupling 28 is energized through the line 30 to cause connection of the shaft 15 to the sprocket 34 thereby driving the chain loop 31 and opening the door 12.

If desired, three separate radio receivers may be used rather than a single receiver with three tuned RF circuits having their outputs coupled to the motor power unit 18.

It may also be desirable to prevent energization of two of the couplings when the third coupling is energized, thus preventing a second coded radio signal from operating a second coupling and placing the excessive burden of operating two doors simultaneously on the motor unit 18. Suitable circuits can be provided in the motor power unit 18 to permit energization of only one of the plurality of couplings at any time.

Figure 2:
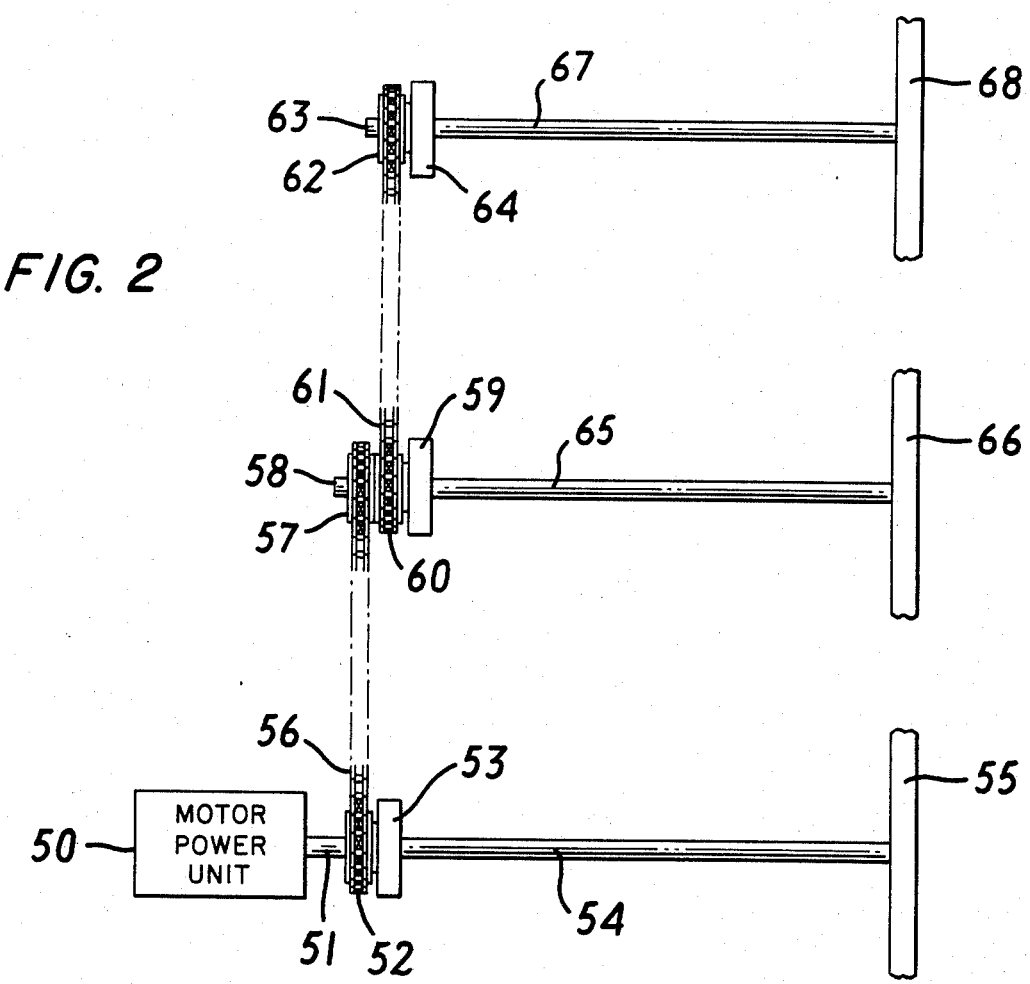
FIG. 2 is another multiple door opening system in accordance with the present invention in which certain electrical circuit details have been omitted.

Referring to FIG. 2, which shows diagrammatically a selectively operated overhead door system, but for simplicity omits the electrical circuits shown in FIG. 1, a motor power unit 50 is connected by a shaft 51 to a sprocket 52 on the input member of a coupling 53 such as an electromagnetic clutch. The output member of the coupling 53 is connected to a screw drive and track mechanism 54, commonly used for overhead door operators to operate a door 55. For example, the Stanley Works manufactures and sells Premier Screw Drive Model 4100 which includes a rail and steel screw for overhead door operation. Clopay Door Products Division also manufactures and sells Deluxe Model 8200 using a screw drive and track mechanism.

A chain loop 56 connects the sprocket 52 to a sprocket 57 on an input shaft 58 of another selectively energizable coupling 59. A second sprocket 60 on the shaft 58 is connected by a chain loop 61 to a sprocket 62 on an input shaft 63 of another coupling 64. The output member of the coupling 59 is connected to a screw drive and track 65 which operates door 66 and the output member of the coupling 64 is connected to a screw drive and track 67 driving a door 68.

Figure 3:
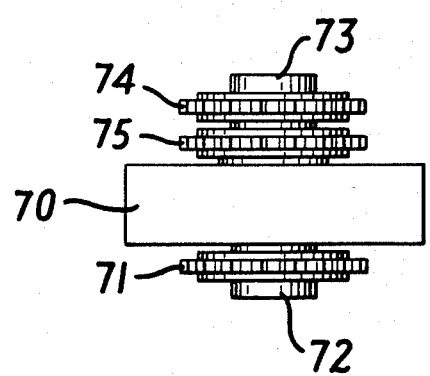
FIG. 3 is a detailed view of a coupling assembly for an alternate type of drive mechanism usable in the inventive system.

If it is desirable to provide a chain loop in a horizontal plane with a vertical sprocket axis, a coupling 70 shown in FIG. 3 includes a sprocket 71 on an output shaft 72. An input shaft 73 of the coupling 70 carries a pair of sprockets 74 and 75. With this arrangement, the coupling 70, and additional couplings having only one input sprocket, can be substituted for the couplings 59, 53 and 64, respectively, of FIG. 2 to provide chain loops in horizontal planes for driving the doors 66, 55 and 68. It will be understood that the chain loops would replace the screw drives 54, 65 and 67.

Note that chain drive overhead door operators are manufactured and sold by the Stanley Works of New Britain, Conn., Clopay Door Products Division of Cincinnati, Ohio and Guardian Garage Doors of Aurora, Ill. Many other chain drive track arrangements are disclosed in issued U.S. patents.

Figure 4:
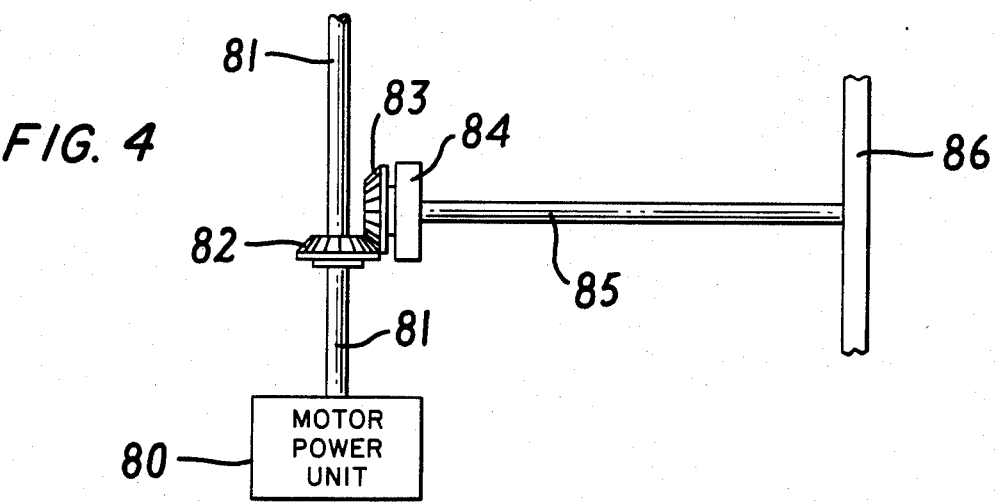
FIG. 4 is a detailed view of another alternate type of drive mechanism usable in the inventive system.

It is apparent that other mechanical arrangements between the motor power unit, the couplings and the door operating drives may be used. For example, as shown in FIG. 4, a motor power unit 80 drives a shaft 81 on which are mounted a plurality of bevel gears 82 (only one is shown) mating with bevel gears 83 on the input members of couplings 84 selectively connected to screw drive and track mechanisms 85 to operate overhead door 86, and other doors (not shown) when the electromagnetic couplings are selectively energized.

The above-described motor drives using shafts or chains, or other mechanical drives, can be used with individual door drive mechanisms such as screw shaft, chain drive or other arrangements, in any desired combination.

The invention has been described in connection with residential overhead garage doors and non-residential overhead doors used in industrial, commercial and municipal fields, including doors for warehouses, factory receiving and shipping bays, firehouses and the like. In these latter applications, the doors are often larger and heavier, requiring more powerful motor drives, and the door operators are more likely to be connected to the two sides of a door, rather than to the door center. With the latter arrangement, a pair of selective couplings can be used to couple the motor power unit to the two chain loops, screw drives or the like on each door. Or if desired, the two driving chain loops for each door can be connected to sprockets on a single cross shaft that connects, via another sprocket and chain loop, to the motor power unit through a selective coupling. Also, the additional feature of opening and closing the doors in unison, described above, is often desirable in the non-residential overhead door field.

The invention has been described with reference to specific embodiments. It will be understood, however, that various changes and modifications may be made within the scope of the invention which is defined in the appended claims.

I claim:

1. Apparatus for selectively operating a plurality of doors mounted for overhead opening comprising a motor power unit coupled to a mechanical drive means, switching means responsive to actuation for energizing the motor power unit, drive means connected to each door for opening or closing the door, a like plurality of normally inoperative electrically actuated coupling means having input and output members, an output member of each one of the coupling means connected to a corresponding one of the drive means, the mechanical drive means connected to the input members of the electrically actuating coupling means, and said switching means that energizes the motor power unit also electrically actuating one or more of the coupling means to couple together the input and output members and cause the power unit to operate the mechanical drive means for opening and closing one or more of the doors.

2. Apparatus as defined in claim 1, wherein one of the doors is opened or closed.

3. Apparatus as defined in claim 1, wherein one or all of the doors may be opened or closed.

4. Apparatus as defined in claim 1, wherein the electrically actuated coupling means comprises an electromagnetic clutch.

5. Apparatus as defined in claim 2, 3 or 4, in which means are provided to prevent the non-selected coupling means from being rendered operative when the selected one of the coupling means is operative.

6. Apparatus for selectively operating a plurality of remotely operated door adjacently mounted for overhead opening comprising a motor power unit coupled to a mechanical drive means, radio receiver means responsive to coded radio signals for energizing the motor power unit, drive means connected to each door for opening or closing the door, a like plurality of normally inoperative electrically actuated coupling means having input and output members, an output member of each one of the coupling means connected to a corresponding one of the drive means, the mechanical drive means connected to the input members of the electrically actuated coupling means, and said radio receiver means also responsive to said coded radio signals for electrically actuating one or more of the coupling means to couple together the input and output members and cause the motor power unit to operate the mechanical drive means for opening and closing one or more of the doors.

7. Apparatus as defined in claim 6, wherein only one of the coupling means is electrically actuated to open or close a selected one of the doors.

8. Apparatus as defined in claim 6, wherein a selected one or all of the coupling means may be electrically actuated to open or close one or all of the doors.

9. Apparatus as defined in claim 6, wherein the coupling means comprises an electromagnetic clutch.

10. Apparatus as defined in claim 6, 7, 8 or 9, wherein the mechanical drive means comprises a shaft.

11. Apparatus as defined in claim 6, 7, 8, or 9, wherein the mechanical drive means comprises a chain drive.

12. Apparatus as defined in claim 8 or 9, in which means are provided to prevent the non-selected coupling means from being rendered operative when the selected one of the coupling means is operative.

* * * * *